United States Patent Office

3,751,468
Patented Aug. 7, 1973

3,751,468
OXIMINO CYCLIC HYDROCARBONS
Jerome Robert Olechowski, Trenton, N.J., assignor to Cities Service Company, New York, N.Y.
No Drawing. Filed Aug. 20, 1971, Ser. No. 175,780
Int. Cl. C07c 131/08
U.S. Cl. 260—566 A     1 Claim

ABSTRACT OF THE DISCLOSURE

A method for manufacturing oximino cyclic hydrocarbons by dehydrohalogenation of oximino halo cyclic hydrocarbons and novel compositions obtained thereby are disclosed.

Oximinocyclododecatrienes are prepared by the dehydrohalogenation of oximinochlorocyclododecadiene in the presence of a basic dehydrohalogenating agent. In one embodiment dehydrohalogenation in the presence of an organic amine yields a product having a melting point of about 165–166° C. In another embodiment, using an inorganic base such as potassium hydroxide in tertiary butanol yields a product having a melting point of from about 80°–85° C. which is a stereoisomer.

The unsaturated oximes obtained are hydrogenated under mild reaction conditions to yield a saturated oxime which is subjected to a Beckmann rearrangement to yield a lactam and the lactam converted to a polyamide which is used in the manufacture of fibers, filaments, molded articles such as containers and the like.

The oxime is hydrolyzed in the presence of an accepter for the hydroxyl amine produced as a by-product of the hydrolysis to give either a saturated or unsaturated ketone depending on whether a saturated or unsaturated oxime is used as the starting material. Both the saturated and unsaturated ketones are useful as fragrance materials.

---

The dehydrohalogenation of an organic compound is known in the art whereby hydrogen halide is removed from the compound and an unsaturated organic compound is obtained. The reaction is conducted in the presence of a dehydrohalogenating agent such as lithium chloride in the combination with dimethylformamide.

The attempted dehydrohalogenation of oximinohalocyclododecadiene according to the prior art method in which lithium chloride and dimethylformamide are employed as the dehydrohalogenation agent was unsuccessful for the production of an oximino cyclic hydrocarbon and resulted in the manufacture of a tar-like product which could not be identified.

Because the dehydrohalogenation reaction was unsuccessful employing lithium chloride and dimethylformamide with the oximinohalocyclododecadiene, it appears that the production of oximino cyclic hydrocarbons from the corresponding oximino halo cyclic hydrocarbons by dehydrohalogenation is not possible.

It has been discovered that organic amines or inorganic bases including the basic metals and metal oxides, lower alkoxides or hydroxides can be used to dehydrohalogenate oximino halo cyclic hydrocarbons to obtain the corresponding oximino cyclic hydrocarbon.

In one embodiment, it has been discovered that an organic amine can be used to dehydrohalogenate oximinohalocyclododecadiene to yield oximinocyclododecatriene having a melting point of about 165°–166° C.

In another embodiment, employing an inorganic base as the dehydrohalogenation agent, oximinocyclododecatriene having a melting point of about 80°–85° C. is obtained.

The difference in melting points of the foregoing oximinocyclododecatrienes is due to the fact that two different stereoisomers are formed. Since the specific stereo configuration of each of the oximinocyclododecatrienes has not been precisely identified, these compounds are presently identified by their melting points.

The oximino halo cyclic hydrocarbons employed are based on cyclic hydrocarbons containing up to about 12 ring carbon atoms and substituted with oximino and halo groups. The oximino halo substituted cyclic hydrocarbons have up to about 2 residual carbon-to-carbon unsaturated positions such as carbon-to-carbon double bonds. The residual unsaturation is defined as those unsaturated positions remaining in the ring after oximino and halo substitution. The preferred oximino halo substituted cyclic hydrocarbons are those containing 12 ring carbon atoms and 2 carbon-to-carbon unsaturated positions especially carbon-to-carbon double bonds. The preferred substituted cyclic hydrocarbons are also free of substituents other than oximino or halo groups.

The dehydrohalogenation of the foregoing oximino halo cyclic hydrocarbons results in the production of an oximino unsaturated cyclic hydrocarbon containing up to about 12 ring carbon atoms. The oximino unsaturated cyclic hydrocarbons immediately obtained will therefore, always, have one unsaturated group more than the oximino halo cyclic hydrocarbon employed as the starting material. Thus, for example, where the oximino halo cyclic hydrocarbon contains two unsaturated positions, upon dehydrohalogenation an oximino unsaturated cyclic hydrocarbon having 3 unsaturated groups is obtained.

The oximino unsaturated cyclic hydrocarbons obtained according to the present method may be hydrogenated to form oximino saturated cyclic hydrocarbons having up to about 12 ring carbon atoms.

Novel oximino compounds are obtained by employing the aforementioned amine base dehydrohalogenation and comprise the oximinocyclododecatrienes, especially 1-oximino-2,5,9-cyclododecatriene (melting point about 165°–166° C.).

By employing the previously described process in which an inorganic base is used in the dehydrohalogenation of oximinohalocyclododecadienes novel compounds comprising oximinocyclododecatrienes are obtained, especially 1-oximino-2,5,9-cyclododecatriene (melting point about 80°–85° C.).

Any primary, secondary or tertiary amine may be used in the process, such as the alkyl amines, aryl amines or alkyl aryl amines and heterocyclic amines known in the art where the alkyl groups preferably are lower alkyl groups and the aryl groups preferably are selected from a member of a group consisting of phenyl, benzyl, tolyl and xylyl and naphthyl groups. The preferred amines are tertiary amines the hydrohalide salt of which is insoluble in the solvent in which the dehydrohalogenation reaction is conducted especially lower alkyl tertiary amines. Tertiary amines employed in this respect include by way of example diethylbenzylamine, diethyl-naphthyl-amine, diethylphenylamine, triethylamine, trimethylamine, tripropylamine, tributylamine and the various isomers thereof pyridine, piperidine, dimethylaniline and the like or any combination thereof, especially the 2 or 3 component combinations thereof. These amines are known in the art and are described in more detail in the Encyclopedia of Chemistry and Technology, Kirk-Othmer.

The inorganic base employed comprises a Group I–A metal or a composition derived from a Group I–A metal where the Group I–A metals are lithium, sodium, potassium, rubidium and cesium. The inorganic base is also a Group II–A metal or derived from a Group II–A metal comprising beryllium, magnesium, calcium, strontium or barium. The preferred Group I–A metals are lithium, sodium or potassium, whereas the preferred Group II–A metals are calcium, strontium or barium. The most preferred Group I-A metals are sodium and potassium and the most preferred Group II-A metal is calcium.

The derivatives of the Group I-A or II-A metals including the preferred and most preferred species described above are the oxides, hydroxides or alkoxides, especially the lower alkoxides of the Group I-A and II-A metals. The Group I-A and II-A metals, hydroxides, oxides or alkoxides are preferably used in solution, suspension or dispersion especially an organic solvent, as is the case with employing potassium hydroxide in a lower alkanol. The Group I-A and II-A metals, oxides, alkoxides or hydroxides, accordingly are preferably used in an organic solvent, such as a lower alkanol, where the alkanol has up to about 4 carbon atoms as well as the isomers thereof. Any combination of solvents, especially the two or three component combinations or azeotropic combinations are employed.

The solvents should be inert towards the reactants by which it is intended that any solvent may be employed which is empirically observed to dissolve, suspend or disperse the reactants and which does not enter into and/ or does not adversely affect the process.

When employing the aforementioned organic amine in the process, a solvent is selected that will not dissolve the by-product amine hydrochloride.

The addition of a nitrosyl halide to an unsaturated cyclic hydrocarbon for obtaining the oximino cyclic halo hydrocarbons disclosed herein is generally conducted in the presence of a solvent such as acetic acid or any of the 1 to about 3 carbon atom aliphatic acids or mixtures thereof, the 1 to about 5 carbon atom aliphatic alcohols or mixtures thereof, esters of the said acids and said alcohols, mixtures of such esters, acetonitrile and aromatic solvents, such as for example, benzene, toluene and xylene, as well as aliphatic ethers having up to about a total of 8 carbon atoms. Any combination of these solvents may be used especially the two or three component combinations or the azeotropic combinations.

The oximino halocyclic hydrocarbon is obtained by the addition of a nitrosyl halide, such as nitrosyl chloride or nitrosyl bromide to a cyclic hydrocarbon having up to about 12 ring carbon atoms and containing up to about 3 unsaturated groups where the unsaturation comprises at least one carbon-to-carbon double bond and preferably up to about 3 carbon-to-carbon double bonds. The cyclic hydrocarbon is preferably free from any other substituents. The resulting oximino halo cyclic hydrocarbon will contain 1 less unsaturated group than the starting cyclic hydrocarbon due to addition of the nitrosyl halide at the unsaturated position of the cyclic hydrocarbon.

The halo and halide compositions referred to throughout the specification and claims are intended to be those derived from the halogens, chlorine, bromine and iodine, or any combination thereof. The preferred halogen is chlorine because the corresponding chloro and chloride compositions employed or obtained according to the present invention are either readily available or readily made, such as for example, in the use of oximinochlorocyclododecadienes for the production of oximinocyclododecatrienes.

Time, temperature and pressure conditions for conducting the reaction are not critical. The temperature generally should be sufficiently high so that the reactants are readily suspended, dissolved or dispersed in the solvent. For example, the dehydrohalogenation reaction can be conducted in a reaction vessel immersed in an ice bath. Temperatures from about 10° to about 50° C. and pressures from about 0.5 atmosphere to about 5 atmospheres may be employed. The pressure may be atmospheric which is intended to include any fluctuations in atmospheric pressure due to a change in natural conditions. Higher or lower pressures may be employed and are dictated to some extent by the volatility of the solvent at the temperatures used for conducting the reaction. The reaction is conducted for a period of time sufficient to obtain a measurable yield of product.

The following examples are illustrative.

EXAMPLE 1

The following example illustrates the preparation of an oximino halo cyclic hydrocarbon and the dehydrohalogenation thereof by means of an organic amine.

A composition comprising 1-oximino-2-chlorocyclododeca-5,9-diene is prepared by the quantitative addition of nitrosyl chloride to 1,5,9-cyclododecatriene in a solvent comprising acetic acid.

The 1-oximino-2-chlorocyclododeca-5,9-diene obtained (23.7 grams, 0.1 mol) is then suspended in either a diethyl ether or benzene solvent to which 13.0 grams (0.1 mol) of triethylamine is added to obtain a mixture which is stirred for several hours at room temperature and then cooled in an ice bath. Triethylamine hydrochloride is obtained as a by-product of the dehydrohalogenation reaction and is removed by filtration because it is insoluble in ether or benzene. A 100% yield of triethylamine hydrochloride is obtained indicating a quantitative conversion of 1-oximino-2-chlorocyclododeca-5,9-diene to 1-oximino-2,5,9-cyclodecatriene the latter being recovered as a heavy viscous oil upon removal of the solvent by vacuum evaporation. The heavy viscous oil is then triturated with ethanol to give a white crystalline solid having a melting point of 165°–166° C. Infrared analysis shows strong absorption for the oxime hydroxyl group as well as a strong band at 915 cm.$^{-1}$ for the =N—O stretch, typical of oximes. The N.M.R. is also consistent with the proposed structure.

Calculated for $C_{12}H_{17}NO$ (percent): C, 75.39; H, 8.90; N, 7.33. Found (percent): C, 75.08, 74.92; H, 8.87, 8.94; N, 7.18, 7.13.

EXAMPLE 2

The following example describes the dehydrohalogenation of an oximinohalocyclododecadiene employing an inorganic base catalyst whereby the stronger basicity of the catalyst results in the stereoisomerization of the oximinocyclododecatriene to a stereo isomeric compound having a melting point of about 80°–85° C.

The 1-oximino-2-chlorocyclododeca-5,9-diene prepared according to the method of Example 1 is dehydrohalogenated with potassium hydroxide in tertiary butyl alcohol in substantially the same manner as Example 1 and a stereoisomeric 1-oximino-2,5,9-cyclododecatriene having a melting point of 80°–85° C. is obtained. Infrared analysis shows no evidence for nitroso or nitroso chloro compounds. Strong absorption for oxime and also for olefinic double bonds is obtained by infrared analysis. The N.M.R. is consistent for the structure.

Calculated for $C_{12}H_{17}NO$ (percent): C, 75.39; H, 8.90; N, 7.33. Found (percent): C, 74.93, 74.88; H, 8.89, 8.88; N, 6.85.

EXAMPLE 3

The following example illustrates a method for the production of 1-oximino-1-cyclododecane by the dehydrohalogenation of oximinochlorocyclododecane.

Cyclododecene is reacted with nitrosyl chloride in acetic acid in order to obtain 1-oximino-2-chlorocyclododecane.

The 1-oximino-2-chlorocyclododecane is then dehydrohalogenated in substantially the same way as employed in the dehydrohalogenation method of Example 1. The product obtained is 1-oximino-2-cyclododecene.

EXAMPLE 4

The following example illustrates that lithium chloride in dimethylformamide does not function as a dehydrohalogenation agent for 1-oximino-2-chlorocyclododeca-5,9-diene.

The method of Example 1 is substantially repeated, however, lithium chloride in dimethyl formamide is employed as a replacement for the triethylamine and a dark colored tar-like material which could not be identified is obtained.

The oximino unsaturated cyclic hydrocarbons obtained according to the invention containing at least one carbon-to-carbon double bond are hydrogenated to give the oximino hydrogenated or saturated cyclic hydrocarbons. Hydrogenation is conducted under mild conditions to avoid reduction of the oximino group. Raney nickel and hydrogen at a pressure from about 60 to about 100 p.s.i.g. at about 20° C. is employed for a sufficient length of time to hydrogenate any residual carbon-to-carbon double bonds in the compound and to avoid reduction of the oximino group. In the case of 1-oximino-2,5,9-cyclododecatriene, the oximinocyclododecane obtained by hydrogenation is converted by means of a Beckmann rearrangement employing sulfuric acid as a catalyst to obtain the lactam which, in turn, is heated to form a polyamide or nylon polymer which is used for the preparation of monofilaments, fibers and molded articles such as containers and the like. The monofilaments and fibers are employed in the manufacture of woven, non-woven and knit fabrics.

The oximino saturated hydrocarbon and the oximino unsaturated hydrocarbon, including the 1-oximino-2,5,9-cyclododecatriene, and 1-oximino-2-cyclododecene is hydrolyzed by hydrogen chloride and water in the presence of an acceptor for the hydroxylamine by-product of the hydrolysis in order to obtain the corresponding saturated and unsaturated ketones cyclododecanone-1-cyclododecene-2-one and 2,5,9-cyclododecatriene-1-one all of which are pleasant-smelling compounds which are used as fragrance materials. The saturated ketone, cyclododecanone, is oxidized to dodecanoic acid by oxidation with air or nitric acid and the like and is used in the manufacture of polyesters based on the condensation of equimolar amounts of phthalic acid, maleic acid and cyclododecanoic acid and a stoichiometric amount of propylene glycol.

The polyester obtained, in turn, is cross-linked with about 30 weight percent styrene in the presence of a benzoyl peroxide catalyst in combination with glass fibers in order to obtain a glass reinforced polyester composition.

When all the foregoing equivalent reaction conditions, and reactants which are described are employed, the same general results are obtained as noted herein. Several of the equivalent conditions and reactants have been described broadly by reference to a range of equivalents by which it is intended that such ranges are to include the specific reactants or values within a group of reactants or between the upper and the lower limits of such range of conditions, as well as narrower ranges or smaller groups of reactants within the broad range of conditions and reactants disclosed. Thus, for example, the temperature for conducting the dehydrohalogenation is about 20° C.; however, temperatures from about 10° to about 40° C. may be employed and any specific value, for example, 10° C., 40° C., 20° C., 15° C. or 12° C. falling within this broad range is also intended as well as a narrower range within this broad range, such as for example, 10° to about 15° C.

Furthermore, where the hydrocarbon, for example, has been described preferably as one containing up to about 12 ring carbon atoms, it is intended to include those hydrocarbons which can be described by a narrower range, such as hydrocarbons having from about 6 to about 12 or about 8 to about 12 ring carbon atoms and so forth for the other ranges used to define the equivalents of the invention. The various conditions and reactants described as being suitable for the present invention are used in any combination with one another and substantially the same results are obtained as disclosed herein.

Although the invention has been described by reference to certain embodiments, it is not intended that the novel compositions of matter and process be limited thereby but that certain modifications are intended to be included within the broad spirit and scope of the foregoing disclosure and the following claim.

What is claimed is:
1. 1-oximino-2,5,9-cyclododecatriene having a melting point of about 165°–166° C.

References Cited
UNITED STATES PATENTS

| | | | |
|---|---|---|---|
| 2,394,430 | 2/1943 | Crowder et al. | 260—566 A |
| 2,890,248 | 6/1959 | Craig | 260—566 A |
| 3,303,217 | 2/1967 | Genas et al. | 260—566 A |

OTHER REFERENCES

Wagnor and Zook: "Synthetic Organic Chemistry," pp. 37–38 (1953).

Groggins: "Unit Processes in Organic Chemistry," Fourth Edition, pp. 219–221 (1952).

Patai: "The Chemistry of the Carbonyl Group," pp. 608–09 (1966).

LEON ZITVER, Primary Examiner

G. A. SCHWARTZ, Assistant Examiner

U.S. Cl. X.R.
260—586 A